A. SALTZER.
AUTOMOBILE WHEEL.
APPLICATION FILED JAN. 3, 1910.
1,002,873.
Patented Sept. 12, 1911.
3 SHEETS—SHEET 1.
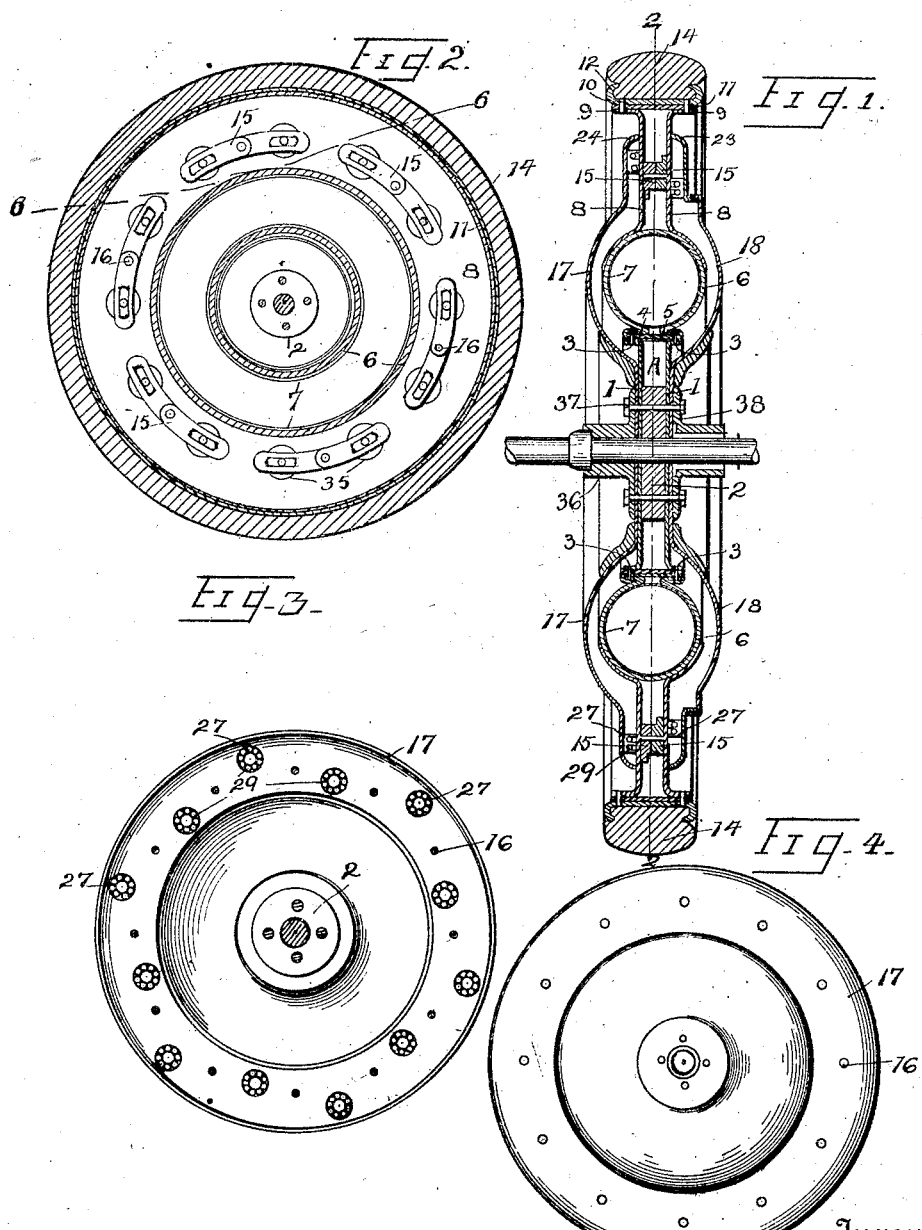

A. SALTZER.
AUTOMOBILE WHEEL.
APPLICATION FILED JAN. 3, 1910.

1,002,873.

Patented Sept. 12, 1911.

3 SHEETS—SHEET 2.

Witnesses
Mae E. Connor
Olive D. White.

Inventor
Andrew Saltzer
by Thos. E. Barrow, Attorney

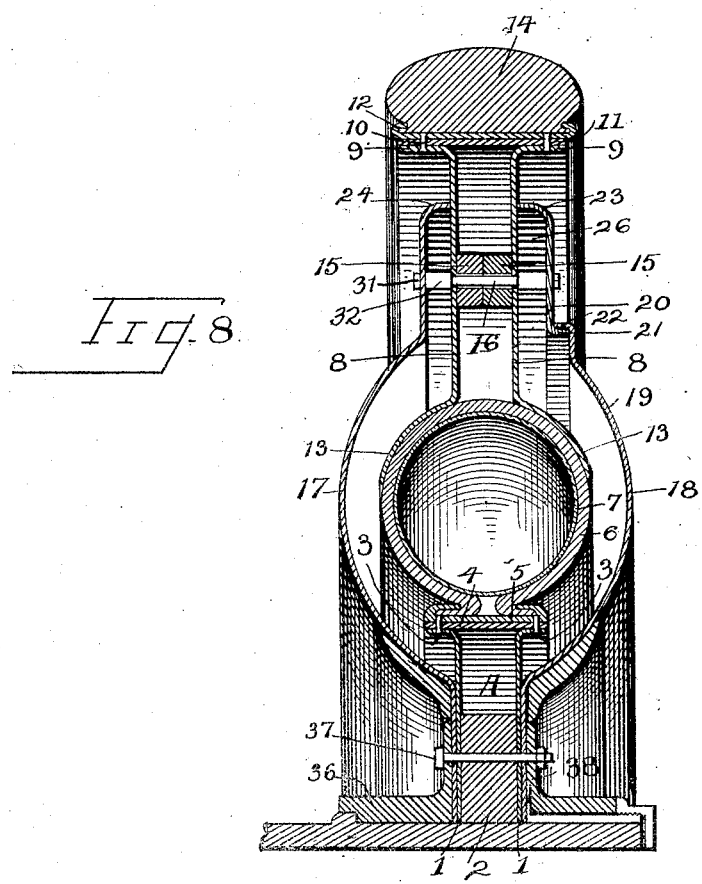

UNITED STATES PATENT OFFICE.

ANDREW SALTZER, OF SAWTELLE, CALIFORNIA, ASSIGNOR OF ONE-HALF TO MATTHEW RYAN, OF SAWTELLE, CALIFORNIA.

AUTOMOBILE-WHEEL.

1,002,873.  Specification of Letters Patent.  Patented Sept. 12, 1911.

Application filed January 3, 1910. Serial No. 536,086.

*To all whom it may concern:*

Be it known that I, ANDREW SALTZER, citizen of the United States, residing at Sawtelle, in the county of Los Angeles and State of California, have invented certain new and useful Improvements in Automobile-Wheels, of which the following is a specification.

My invention relates to improvements in automobile wheels.

The objects of my invention are to provide a wheel for automobiles that is puncture proof, and dust proof; and to so construct and arrange the parts that when the machine is in motion the rebound of the body when the wheels are passing over an obstruction or into a depression, is obviated to a great extent.

Further it is aimed to obviate the necessity of using pneumatic tires or tubes on the outer periphery of the wheel, and to make a cheap, durable, and efficient wheel for the purpose stated.

Figure 5:
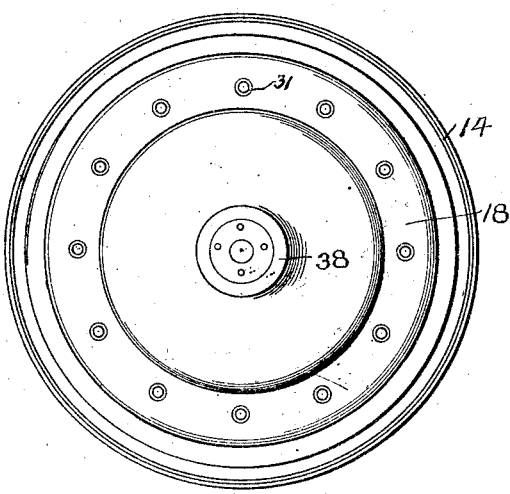
Figure 6:
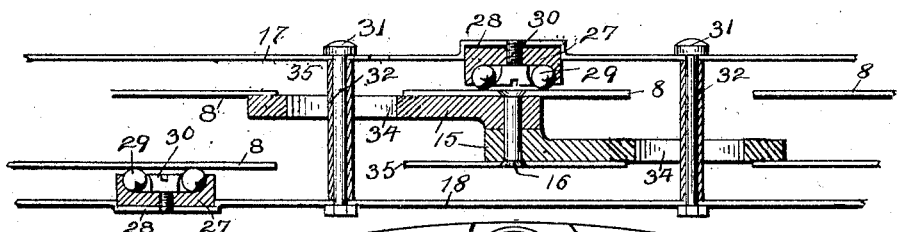
Figure 7:
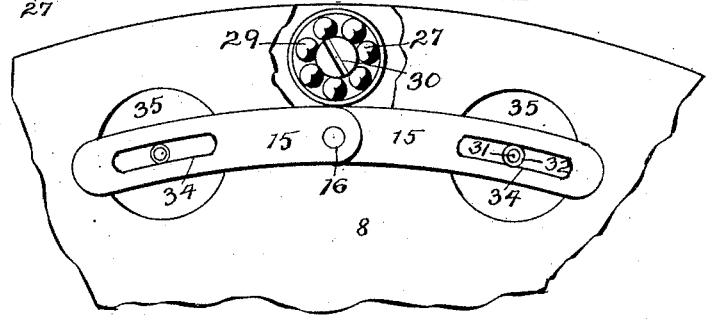

These objects I accomplish by the construction shown in the accompanying drawings in which, Figure 1 is a vertical sectional view of my improved vehicle wheel. Fig. 2 is a front sectional view taken on line 2—2 of Fig. 1 showing fully the construction and arrangement of the retainer links, Fig. 3 is an inner vertical view of the wheel casing, showing the construction of the anti-friction side bearings, Fig. 4 is a side elevation of same, Fig. 5 is a side elevation of the wheel, Fig. 6 is an enlarged sectional view taken on line 6—6 of Fig. 2 showing the construction of the retainer links, and antifriction side bearings secured upon the inside of the casings. Fig. 7 is a transverse view of same showing the retainer links secured in position, the side plate being broken away to show the antifriction bearings secured to the outer casing. Fig. 8 is an enlarged sectional view of my improved wheel to show more fully the construction and arrangement of the parts constituting the invention.

Similar letters and figures of reference indicate the several parts throughout the several views.

In the accompanying drawings A represents the center or hub of the wheel, which is composed of two circular disks or plates 1, 1, secured upon each side of the center block 2. The peripheries of the disks 1, 1, are provided with outwardly projecting flanges 3, 3, and secured upon the said flanges is the flat band 4 and upon the band is secured the clench-ring 5 in which is placed and secured the flanges of the pneumatic tube 6 which tube may be rubber or leather or any flexible material.

The inner tube 7 is composed of rubber and is similar to the inner tubes used within the casing of a pneumatic tire being inflated in the usual manner.

8, 8 are circular disks forming the wheel proper, the said disks being provided upon their outer peripheries with outwardly projecting flanges 9, 9. The disks 8, 8 are held a given distance apart by being riveted together to the metal rim 11 by means of rivets 10 passing through the flanges 9, 9, rim 11, and clench rim 12. The inner edges 13, 13, of disks 8, 8, are bowed outwardly and form a seat in which engages the outer periphery of the pneumatic tube 6.

The tire 14 may be composed of solid rubber, leather, or any suitable flexible material.

15 represents links formed with slots 34, the links being pivoted between the disks 8, 8 in the space provided by the two disks. The links 15 are of the form shown in Figs. 6 and 7, and are pivoted in pairs upon pins 16 which pass through the same, the ends of the pins or bearings being riveted through the plates 8, 8. The objects of the links will be more fully described hereinafter.

17 represents the inner sheet metal casing which covers one side of the pneumatic tube. The said casing is pressed concave in line with the pneumatic tube, the inner portion and outer portion being flat. The inner and outer casings 17 and 18 are similarly formed except the casing 18 is made in two parts 19 and 20. The part 20 is provided with an outwardly projecting flange 21 formed around the opening of the disk and threaded upon the outside and the portion 19 is formed with an inwardly projecting flange 22 threaded upon the inside. The object of having the center part 19 detachable is for the purpose of access to the pneumatic tube when necessary. The outer edges 23 and 24 of the casings 18 and 17, respectively are bent inwardly forming a space or hollow portion 26 upon both sides of the wheel. The spaces are formed to receive a series of ball-cups 27 one line above the line of retainer links and one line below the same. The said cups fit in recesses 28 pressed into the casings 17 and 18. The balls 29 are held within the cups by the curved studs or bolts 30.

31 indicates stay bolts which are twelve in number and extend through both casings. A sleeve 32 is placed over each stay bolt and has its ends bearing against the inner face of the casings 17 and 18. The said bolts and sleeves pass through the slot holes 34 in the outer ends of the retainer links 15 and openings 35 in the wheel plates 8 and 8. The balls 29 bear against the outer face of the wheel plates 8, 8. The objects of the ball bearings is to allow a sliding movement between the parts of the wheel. The object of the links is to prevent the outer portion of the wheel from turning on the pneumatic tube 6 when the brake is applied. The hub 36 of the wheel is secured to the center block and wheel plate by bolts 37 passing through the hub-flanges 38 casings 17 and 18 and center block 2 clamping all the parts firmly together. This is fully illustrated in Figs. 1 and 8.

It will be readily seen by those skilled in the art, that all danger from puncture is obviated as the pneumatic tire does not come in contact with the ground, and that the casings covering the pneumatic tire makes it dust proof as well. The pneumatic tire forms a spring between the tire portion of the wheel and the axle of the vehicle, and in conjunction with the body springs prevents nearly all rebound between the trucks and wheels.

The retainer links 15 which are pivoted together at their inner ends in pairs prevent the tire or outer rim of the wheel from rotating around the hub of the wheel and they also obviate all vibrating or backlash when rotating the vehicle. They cause the wheel to rotate in a manner similar to a solid wheel and still allow all necessary spring vertically upon the pneumatic tube.

The pneumatic tube is held upon the hub from rotating with respect to the same by the clench-rim 5.

What is claimed is:

A wheel including a hub, a pneumatic tube secured to the hub, a pair of spaced disks seating on the pneumatic tube, a tire secured to the peripheries of the disks, slotted links having their adjacent ends in engagement, bolts passing through the disks and said adjacent ends of the links, an outer casing inclosing the pneumatic tube, said outer casing comprising a pair of oppositely disposed members arranged in spaced relation to the disks, said members pressed outwardly to receive ball bearings alternately above and below the said links, and stay bolts secured to said outer members and passing through the slots in the links.

In testimony whereof I affix my signature, in presence of two witnesses.

ANDREW SALTZER.

Witnesses:
W. H. BOWENS,
J. R. FAIRBANK.